(12) United States Patent
Barve et al.

(10) Patent No.: US 12,675,493 B2
(45) Date of Patent: *Jul. 7, 2026

(54) SYSTEMS AND METHODS FOR MAPPING A TERM TO A VECTOR REPRESENTATION IN A SEMANTIC SPACE

(71) Applicant: nference, Inc., Cambridge, MA (US)

(72) Inventors: Rakesh Barve, Bangalore (IN); Akash Anand, Bhagalpur (IN); Arjun Puranik, San Jose, CA (US); Murali Aravamudan, Andover, MA (US); Venkataramanan Soundararajan, Andover, MA (US); Aravind Srinivasan, Ellicott City, MD (US)

(73) Assignee: nference, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,305

(22) Filed: Jun. 14, 2024

(65) Prior Publication Data

US 2024/0338375 A1    Oct. 10, 2024

Related U.S. Application Data

(63) Continuation of application No. 17/151,965, filed on Jan. 19, 2021, now Pat. No. 12,038,935.

(60) Provisional application No. 62/962,433, filed on Jan. 17, 2020.

(51) Int. Cl.
　　*G06F 16/24*　　(2019.01)
　　*G06F 16/2458*　　(2019.01)
　　*G06F 16/93*　　(2019.01)
　　*G06F 17/16*　　(2006.01)

(52) U.S. Cl.
　　CPC .......... *G06F 16/2458* (2019.01); *G06F 16/93* (2019.01); *G06F 17/16* (2013.01)

(58) Field of Classification Search
　　CPC ................................................. G06F 16/2458
　　See application file for complete search history.

(56) References Cited

U.S. PATENT DOCUMENTS

| | | | |
|---|---|---|---|
| 7,003,442 B1 | 2/2006 | Tsuda | |
| 9,183,203 B1 | 11/2015 | Tuchman et al. | |
| 10,990,767 B1 * | 4/2021 | Smathers | G06F 18/214 |
| 2002/0052901 A1 | 5/2002 | Guo et al. | |
| 2004/0220925 A1 | 11/2004 | Liu et al. | |
| 2006/0122976 A1 | 6/2006 | Baluja et al. | |
| 2007/0073690 A1 | 3/2007 | Boal et al. | |
| 2007/0118506 A1 | 5/2007 | Kao et al. | |
| 2011/0078148 A1 | 3/2011 | Lung | |
| 2011/0137921 A1 | 6/2011 | Inagaki | |
| 2012/0079372 A1 | 3/2012 | Kandekar et al. | |
| 2012/0204104 A1 | 8/2012 | Walsh | |
| 2012/0254188 A1 | 10/2012 | Koperski et al. | |
| 2014/0080428 A1 | 3/2014 | Rhoads et al. | |
| 2015/0310115 A1 | 10/2015 | Ryger et al. | |
| 2016/0378806 A1 * | 12/2016 | Hopcroft | G06F 16/2237 707/715 |

(Continued)

*Primary Examiner* — Mohammad S Rostami
(74) *Attorney, Agent, or Firm* — CALDWELL LLC

(57) ABSTRACT

A method and system is provided for mapping a term to a vector representation in a semantic space. Provided techniques allow for efficient and accurate determination of vector representations for query terms that are terms of emerging interest or are otherwise not included in a set of terms for which vector representations are pre-calculated.

20 Claims, 6 Drawing Sheets

(56)     References Cited

U.S. PATENT DOCUMENTS

| | | | |
|---|---|---|---|
| 2016/0378808 A1 | 12/2016 | Hopcroft et al. | |
| 2018/0285176 A1* | 10/2018 | Mozhaev | G06F 16/951 |
| 2018/0330000 A1* | 11/2018 | Noble | G09B 7/02 |
| 2019/0005049 A1 | 1/2019 | Mittal | |
| 2019/0065505 A1* | 2/2019 | Fukuda | G06F 16/243 |
| 2019/0065506 A1* | 2/2019 | Li | G06N 3/042 |
| 2019/0073351 A1* | 3/2019 | Zhang | G06N 3/045 |
| 2019/0130024 A1 | 5/2019 | Burchfield et al. | |
| 2019/0138660 A1* | 5/2019 | White | G06F 16/3329 |
| 2019/0294692 A1* | 9/2019 | Zhao | G06F 16/951 |
| 2020/0019632 A1 | 1/2020 | Larchev et al. | |
| 2020/0184278 A1 | 6/2020 | Zadeh et al. | |
| 2020/0184307 A1* | 6/2020 | Lipka | G06N 3/02 |
| 2020/0250213 A1* | 8/2020 | Duchin | G06F 16/319 |
| 2020/0342060 A1* | 10/2020 | Park | G06N 3/08 |
| 2020/0380202 A1 | 12/2020 | Cass et al. | |
| 2020/0394567 A1* | 12/2020 | Choe | G06N 5/01 |
| 2020/0410157 A1 | 12/2020 | Kerkhof et al. | |
| 2021/0065045 A1* | 3/2021 | Kummamuru | G06F 16/9038 |
| 2021/0073225 A1 | 3/2021 | Nelson et al. | |
| 2021/0097472 A1* | 4/2021 | Inamdar | G06Q 10/1053 |
| 2021/0112178 A1* | 4/2021 | Perone | G06N 3/044 |
| 2021/0191925 A1 | 6/2021 | Sianez | |
| 2021/0218570 A1 | 7/2021 | Manasse et al. | |
| 2021/0319907 A1* | 10/2021 | Harley | G16H 50/70 |

* cited by examiner

Figure 1:
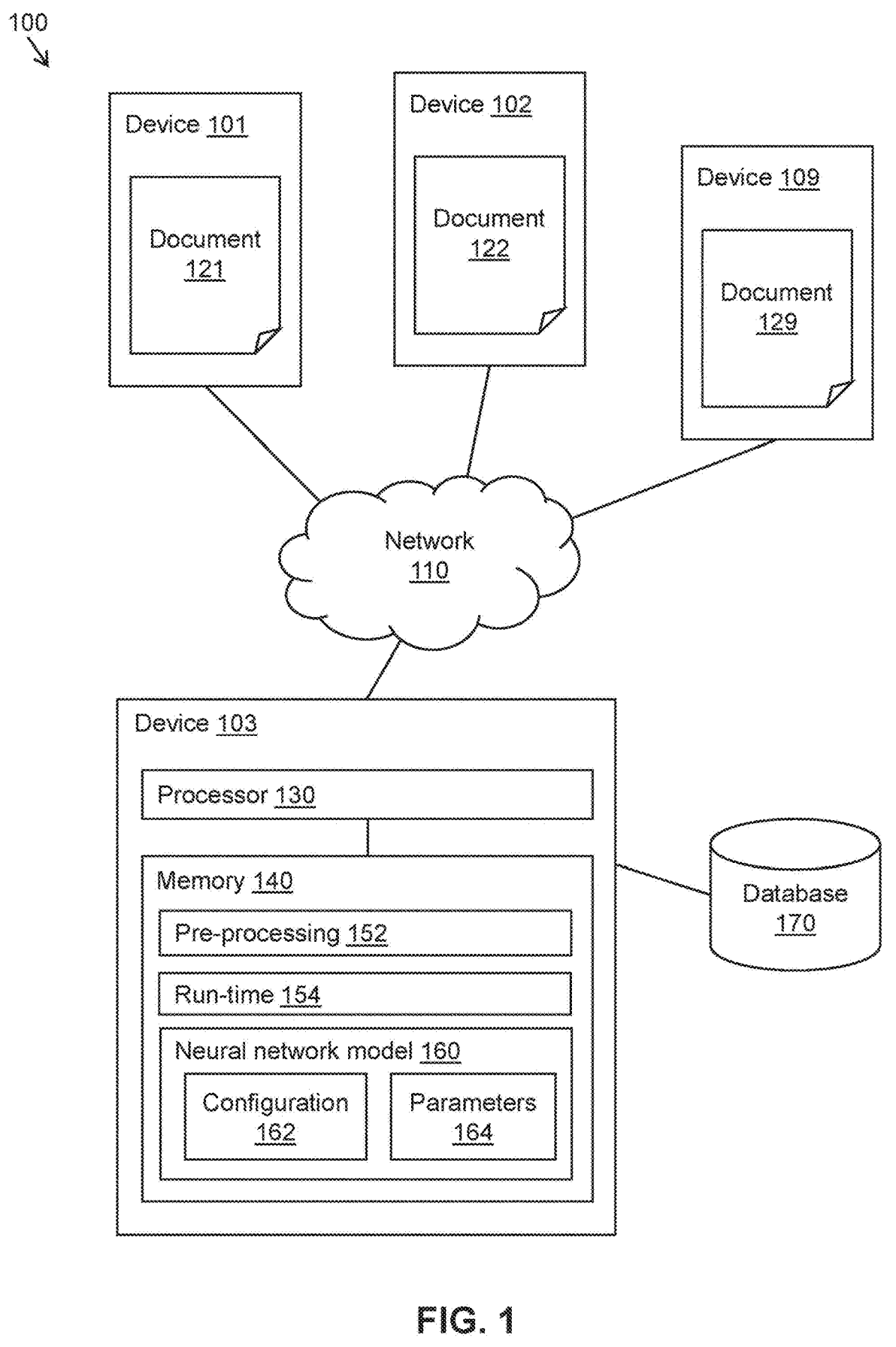

100

Device 101

Document
121

Device 102

Document
122

Device 109

Document
129

Network
110

Device 103

Processor 130

Memory 140

Pre-processing 152

Run-time 154

Neural network model 160

Configuration
162

Parameters
164

Database
170

| Term in Pre-Computed Set | Vector Representation |
|---|---|
| Term 301 | Vector 311 |
| Term 302 | Vector 312 |
| ... | ... |
| Term 309 | Vector 319 |

400

| Term in Predicted Set | Correlation Data |
|---|---|
| Term 401 | Term 411 / Count 421; Term 412 / Count 422 |
| Term 402 | Term 413 / Count 423 |
| ... | ... |
| Term 409 | Term 414 / Count 424; Term 415 / Count 425; Term 419 / Count 429 |

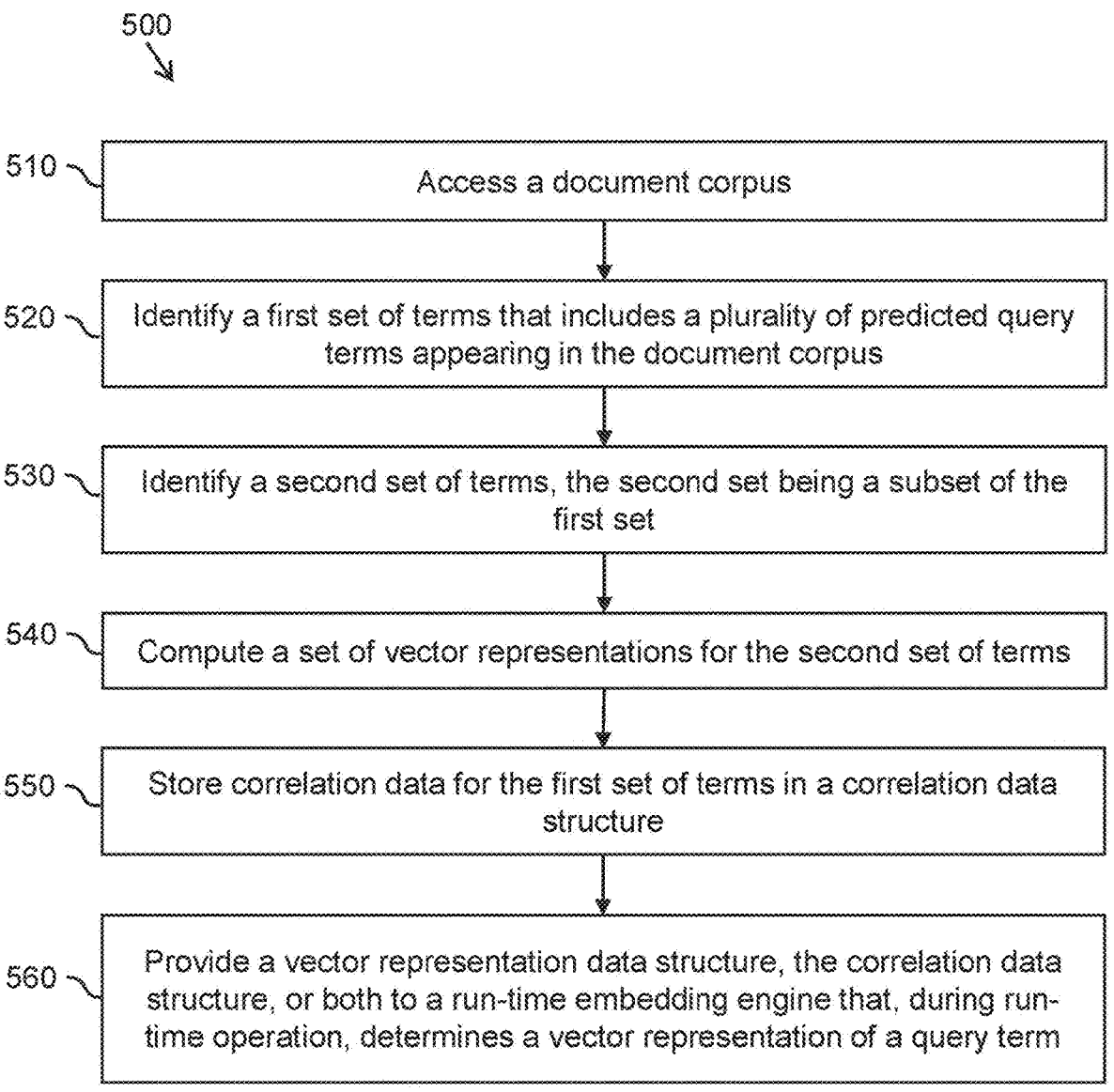

500

510 — Access a document corpus

520 — Identify a first set of terms that includes a plurality of predicted query terms appearing in the document corpus 530 — Identify a second set of terms, the second set being a subset of the first set 540 — Compute a set of vector representations for the second set of terms 550 — Store correlation data for the first set of terms in a correlation data structure 560 — Provide a vector representation data structure, the correlation data structure, or both to a run-time embedding engine that, during run-time operation, determines a vector representation of a query term

FIG. 5

SYSTEMS AND METHODS FOR MAPPING A TERM TO A VECTOR REPRESENTATION IN A SEMANTIC SPACE

CROSS-REFERENCE TO RELATED APPLICATIONS

This application is a continuation of Non-provisional application Ser. No. 17/151,965 filed on Jan. 19, 2021, and entitled "SYSTEMS AND METHODS FOR MAPPING A TERM TO A VECTOR REPRESENTATION IN A SEMANTIC SPACE," which claims benefit under 35 U.S.C. § 119(c) to U.S. Provisional patent Applications No. 62/962,433, filed on Jan. 17, 2020, titled "SYSTEMS AND METHODS FOR MAPPING A TERM TO A VECTOR REPRESENTATION IN A SEMANTIC SPACE," each of which is incorporated by reference herein in its entirety.

FIELD OF THE INVENTION

The present invention generally relates to the field of digital analysis of text data. In particular, the present invention is directed to techniques for mapping a term to a vector representation a semantic space.

BACKGROUND

Whereas humans can understand the meaning of information that is presented in the form of text (e.g., words, phrases, and other terms that are represented as sequences of alphanumeric characters, symbols, emojis, etc.), computer technologies generally cannot grasp the semantic meaning of text in its human-readable form. Instead, to assign meaning to terms, computer technologies typically represent terms as vectors in a semantic space, e.g., a vector space where the semantic meaning of a given term is encoded in a set of numerical values. The similarity or difference between a pair of terms can then be determined based on the distance between the terms in the semantic space (e.g., their cosine similarity). For example, clusters of related terms can be identified based on their proximity in the semantic space.

Natural language processing (NLP) is an illustrative type of computer application in which terms are frequently represented as vectors. In NLP processing pipelines, an embedding process is often included in which each token in a document (e.g., each word, phrase, sentence, etc.) is mapped to a corresponding vector representation in a semantic space. Once the set of vector representations for the document is determined, various types of digital analysis may be performed. For example, the set of vector representations can be provided as an input to a neural network model in order to classify the document, assign a relevance score to the document, identify entities (e.g., names of people, dates, countries) in the document, or the like.

Accordingly, it is desirable to develop improved techniques for mapping terms to their corresponding vector representations in a semantic space.

SUMMARY OF THE DISCLOSURE

In an aspect, a computing device may be configured to access a document corpus; identify a first set of sentences that includes a plurality of predicted query sentences appearing in the document corpus; identify a second set of sentences, the second set being a subset of the first set; store, in a first data structure, correlation data generated from the first set of sentences; store, in a second data structure, a set of vector representations computed from the second set of sentences; provide the first data structure to a run-time embedding engine configured to, during run-time operation, determine a vector representation of a first query sentence among the first set of sentences; and rank a plurality of documents of the document corpus based on the vector representation of the first query sentence and vector representations of sentences of the plurality of documents using a neural network model.

In another aspect, a method may include accessing a document corpus; identifying a first set of sentences that includes a plurality of predicted query sentences appearing in the document corpus; identifying a second set of sentences, the second set being a subset of the first set; storing, in a first data structure, correlation data generated from the first set of sentences; storing, in a second data structure, a set of vector representations computed from the second set of sentences; providing the first data structure to a run-time embedding engine configured to, during run-time operation, determine a vector representation of a first query sentence among the first set of sentences; and ranking a plurality of documents of the document corpus based on the vector representation of the first query sentence and vector representations of sentences of the plurality of documents using a neural network model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

FIG. 1 is a simplified diagram of a system for mapping a term to a vector representation in a semantic space according to some embodiments.

FIG. 5 is a simplified diagram of a method for generating one or more pre-computed data structures based on a document corpus according to some embodiments.

Figure 2:
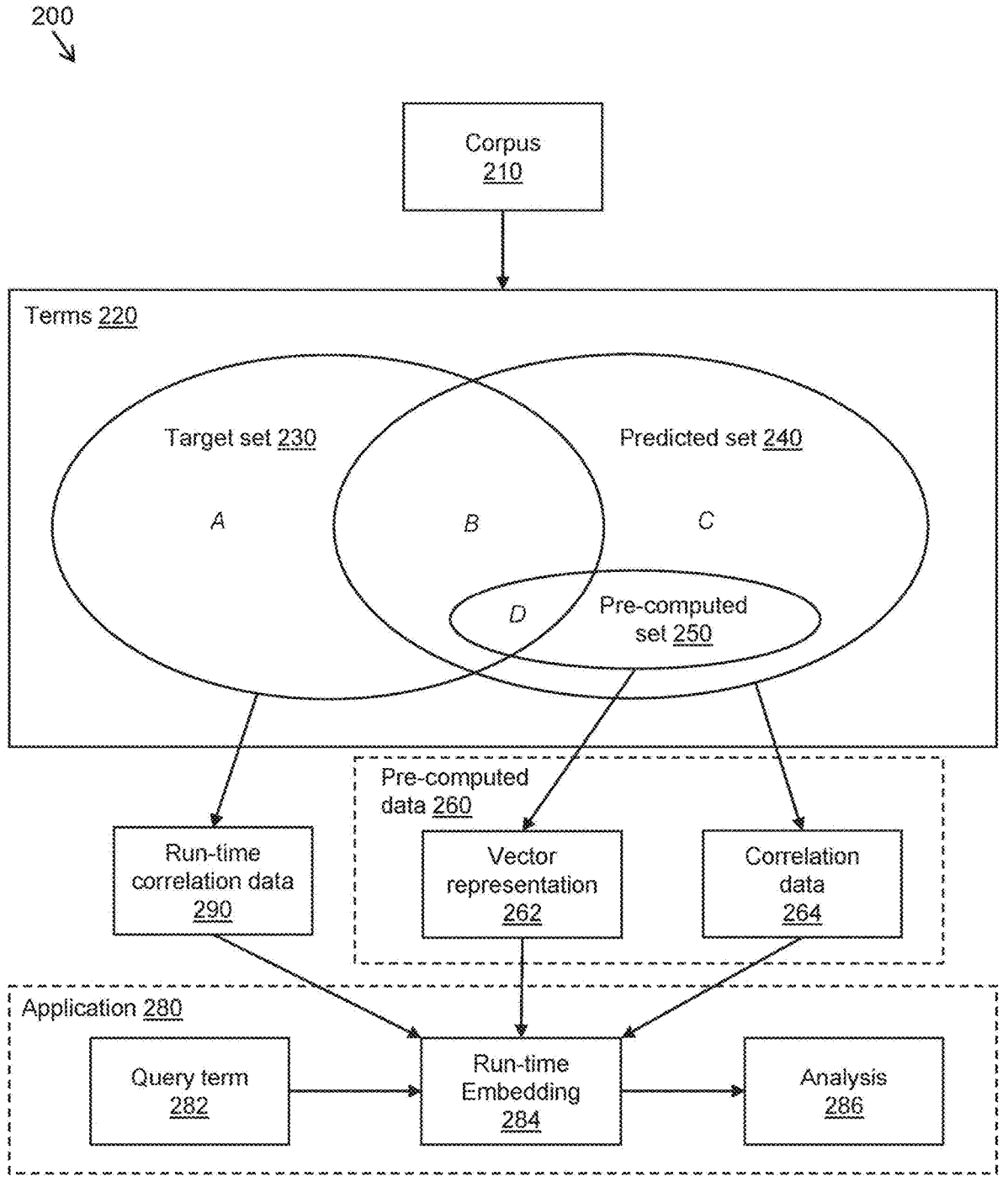
FIG. 2 is a simplified diagram of a data flow for mapping a term to a vector representation in a semantic space according to some embodiments.

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Mapping a term to a vector representation in a semantic space can be challenging. In general, vector representations can be determined by analyzing a corpus of text (e.g., a collection of text documents) and determining relationships among the various terms that appear in the corpus. Based on the relationships among the terms, a semantic space is populated such that each of the terms is mapped to a vector representation in the semantic space. Each of these mapped terms can be thought of as a "named entity," as the vector representation characterizes the term as an entity. For example, a pair of terms may be deemed to be correlated when they frequently appear proximate to one another in the corpus (e.g., they appear directly adjacent to one another or within the same n-word sized window). Other types of relationships between or among terms (e.g., grammatical relationships) may also be detected, and these relationships may be captured in their corresponding vector representations.

After a set of vector representations has been determined, a query term may be received from an application and/or from a user. In a case where the query term is included in the set of terms for which a corresponding vector representation has been pre-determined, the vector representation of the query term can be efficiently retrieved, e.g., by performing a lookup operation on a data structure storing the set of vector representations. On the other hand, in a case where the query term is not included in the set of terms for which a corresponding vector representation has been pre-determined, determining the vector representation of the query term may be challenging and/or inefficient.

Various techniques for mapping a set of terms to their corresponding vector representations operate in a batch mode, such that the semantic space is populated with vector representations for each of the terms in the set in a single pass. If, subsequently, it is desired is to determine a vector representation for a new term that was not part of the original mapping, the mapping is performed again using an updated set of terms that includes the new term. Intermediate results generated during the initial mapping, if any, are not stored for later use or are otherwise not used to facilitate subsequent mappings. Illustrative examples of techniques for determining vector representations in a batch mode include word2vec (Mikolov et al., "Efficient Estimation of Word Representations in Vector Space," arXiv preprint arXiv: 1301.3781, 2013), GloVe (Pennington et al., "GloVe: Global Vectors for Word Representation," in Proceedings of EMNLP, 2014), and fasttext (Joulin et al., "Bag of tricks for efficient text classification," arXiv preprint arXiv: 1607.01759, 2016; Bojanowski et al., "Enriching Word Vectors with Subword Information," Transactions of the Association for Computational Linguistics, 2017).

Determining vector representations in the batch mode can result in various inefficiencies or inaccuracies. For example, re-computing a full set of vector representations each time the set of terms changes (e.g., each time a query term is received that is not include in the set of terms) may consume significant computational resources. Moreover, to avoid repeatedly re-computing the vector representations, applications may be configured to ignore a query term for which a vector representations has not been pre-calculated. Similarly, the applications may map such query terms to a default vector. Either of these approaches may result in a less accurate analysis because the meaning of the query term is not captured in its vector representation. Another approach to addressing the limitations of the batch mode approach may be to configure the set of terms for which vector representations are pre-calculated to be over-inclusive, such that the set includes more terms than are likely to subsequently show up as query terms. While such an approach may increase the likelihood that a given query term has a pre-calculated vector representation, the use of computer resources in this approach may be inefficient given that many of the terms for which vector representations are pre-calculated that are unlikely to be used.

Moreover, the set of terms for which vector representations are pre-calculated are unlikely to include terms of emerging interest. For example, terms of emerging interest may correspond to newly or recently coined terms e.g., terms that first appear in new or recent documents in the corpus. "Coined terms" can also be called "named entities" and both coined terms and named entities are not limited to only newly or recently created terms. Both coined terms and named entities may be deemed entities, thus adding to the list of set of terms of interest to authors, researchers, practitioners in the field. Similarly, terms of emerging interest may include terms that are still in the process of gaining adoption by authors, researchers, practitioners, and the like. Given their topical relevance, terms of emerging interest may be among the most likely to show up as query terms. Nevertheless, these terms may be unlikely to be included among the set of terms for which vector representations are precalculated. For example, vector representations may be pre-calculated for the most frequently occurring terms in the corpus or for a manually curated set of terms (e.g., a community-curated database of terms). However, terms of emerging interest are not likely to be among the most frequently occurring terms in the corpus (e.g., they may appear infrequently in older literature), nor are they likely to be known in advance by a community that is manually curating the set of terms (e.g., their importance may be recognized after the curated list of terms was created).

Accordingly, it is desirable to develop improved techniques for mapping a term to a vector representation in a semantic space, particularly techniques that allow for efficient and accurate determination of vector representations for query terms that are terms of emerging interest or are otherwise not included in a set of terms for which vector representations are pre-calculated.

FIG. 1 is a simplified diagram of a system 100 for mapping a term to a vector representation in a semantic space according to some embodiments. System 100 includes a plurality of devices 101-109 that are communicatively coupled via a network 110. Devices 101-109 generally include computer devices or systems, such as personal computers, mobile devices, servers, or the like. Network 110 can include one or more local area networks (LANs), wide area networks (WANs), wired networks, wireless networks, the Internet, or the like. Illustratively, devices 101-109 may communicate over network 110 using the TCP/IP protocol or other suitable networking protocols.

One or more of devices 101-109 can store digital documents 121-129 and/or access digital documents 121-129 via network 110. For example, as depicted in FIG. 1, devices 101, 102, and 109 store digital documents 121, 122, and 129, respectively, and device 103 accesses digital documents 121-129 via network 110. Digital documents 121-129 can include webpages, digital files, digital images (including one or more frames of a video or an animation), or the like. Illustratively, digital documents 121-129 can be formatted as HTML/CSS documents, PDF documents, word processing documents (e.g., Word documents), text documents, slideshow presentations (e.g., PowerPoint presentations), image files (e.g., JPEG, PNG, or TIFF images), or the like. Digital documents 121-129 can be heterogeneous (e.g., of different formats or file types) or homogenous (e.g., of the same format or file type), and can include structured or unstructured data. In general, digital documents 121-129 include text data, which can include alphanumeric characters, symbols, emojis, image representations of text, or the like. For efficient storage and/or transmission via network 110, documents 121-129 may be compressed prior to or during transmission via network 110. Security measures such as encryption, authentication (including multi-factor authentication), SSL, HTTPS, and other security techniques may also be applied.

According to some embodiments, device 103 may access one or more of digital documents 121-129 by downloading digital documents 121-129 from devices 101, 102, and 109. Moreover, one or more of devices 101, 102, or 109 can upload digital documents 121-129 to device 103. Digital documents 121-129 may be updated at various times. Accordingly, device 103 may access digital documents 121-129 multiple times at various intervals (e.g., periodically) to obtain up-to-date copies.

As depicted in FIG. 1, device 103 includes a processor 130 (e.g., one or more hardware processors) coupled to a memory 140 (e.g., one or more non-transitory memories). Memory 140 stores instructions and/or data corresponding to a pre-processing program 152 and a run-time program 154. When executed by processor 130, pre-processing program 152 and run-time program 154 each cause processor 130 to perform operations associated with mapping a term to a vector representation in a semantic space. In some embodiments, pre-processing program 152 may generate or update one or more pre-computed data structures that May subsequently be accessed by run-time program 154 when performing the mapping, as described in further detail below with reference to FIG. 2.

During execution of pre-processing program 152 and/or run-time program 154, processor 130 may execute one or more neural network models 160. Neural network model 160 is trained to make predictions (e.g., inferences) based on input data. Neural network model 160 includes a configuration 162, which defines a plurality of layers of neural network model 160 and the relationships among the layers. Illustrative examples of layers include input layers, output layers, convolutional layers, densely connected layers, merge layers, and the like. In some embodiments, neural network model 160 may be configured as a deep neural network with at least one hidden layer between the input and output layers. Connections between layers can include feed-forward connections or recurrent connections.

One or more layers of neural network model 160 is associated with trained model parameters 164. The trained model parameters 164 include a set of parameters (e.g., weight and bias parameters of artificial neurons) that are learned according to a machine learning process. During the machine learning process, labeled training data is provided as an input to neural network model 160, and the values of trained model parameters 164 are iteratively adjusted until the predictions generated by neural network 160 match the corresponding labels with a desired level of accuracy.

For improved performance, processor 130 may execute neural network model 160 using a graphical processing unit, a tensor processing unit, an application-specific integrated circuit, or the like.

Device 103 may be communicatively coupled to a database 170. For example, database 170 may be configured as a structured database with contents organized according to a schema or other logical relationships (e.g., relational database). In some embodiments database 170 may be configured as a non-relational database, an unstructured database, a key-value store, or the like. Although database 170 is depicted as being coupled directly to device 103, it is to be understood that a variety of other arrangements are possible.

For example, database 170 may be stored in memory 140, accessed via network 110, or the like.

FIG. 2 is a simplified diagram of a data flow 200 for mapping a term to a vector representation in a semantic space according to some embodiments. In some embodiments consistent with FIG. 1, data flow 200 may be implemented using various components and/or features of system 100, as further described below.

A corpus 210 corresponds to a collection of one or more text documents. For example, corpus 210 may correspond to documents 121-129 received from devices 101-109 and/or may include documents stored locally by device 103. In some embodiments, corpus 210 may be stored in memory 140, database 170, in an on-chip memory (e.g., cache), or the like. The documents in corpus 210 can be stored in a native format (e.g., in the format as received from devices 101-109), or various pre-processing operations may be performed on the received documents to modify the content or format of the documents. For example, non-text data (e.g., image data) and/or metadata may be removed from the documents, text data may be extracted from the documents (e.g., by optical character recognition), or the like. The format of documents 121-129 may be converted to a uniform format, or data from documents 121-129 may be used to populate a database (e.g., database 170). In some embodiments, corpus 210 may be dynamically updated.

The contents of corpus 210 can relate to general subject matter (e.g., a collection of news articles or Wikipedia entries covering a variety of topics) or domain-specific subject matter. Illustratively, corpus 210 may relate to biomedical subject matter. For example, corpus 210 may include text from journal articles, reference textbooks, patent applications, websites, etc. related to biomedical fields. Corpus 210 can be drawn from a wide variety of sources, such as molecular databases, scientific literature, insurance documents, pharmaceutical company websites, news feeds, regulatory information (clinical trials, SEC filings, IP), or the like.

As depicted in FIG. 2, terms 220 correspond to an idealized set of all terms that appear in corpus 210. Examples of terms 220 can include, but are not limited to, single words, multiple-word phrases, sentences, paragraphs, and the like. Multiple-word terms can include adjacent combinations of words or combinations of words that are separated by other words. Terms 220 can also include numbers, objects (e.g., equations), symbols, and various other information contained in corpus 210 that may provide a function analogous to words and phrases. Various processes can be used to extract terms 220 from corpus 210, including tokenization (e.g., splitting the text of corpus 210 into terms based on the location of white space, punctuation, or the like), stemming or lemmatization (e.g., identifying the base or root form an inflected word), or the like.

Terms 220 can be divided into various subsets, including a target set 230. Target set 230 corresponds to an idealized, forward-looking set of terms among terms 220 that are later used as query terms for which vector representations are desired. To improve run-time efficiency of subsequent applications in which the terms in target set 230 are mapped to corresponding vector representations, it is generally desirable to pre-compute vector representations for each term in target set 230. However, the terms in target set 230 are not known in advance.

Although target set 230 is not known in advance, various techniques may be used to predict the terms in target set 230. Using on these techniques, a predicted set 240 is generated and includes terms that are predicted to be included in target set 230. In general, it is desirable for predicted set 240 to match target set 230 as closely as possible. For example, the closeness of the match can be measured in terms of recall (e.g., the number or fraction of terms in target set 230 that are also included in predicted set 240) and precision (e.g., the number or fraction of terms in predicted set 240 that are also included in target set 230). Referring to the labeled regions of FIG. 2, recall may correspond to a comparison of the combined number of terms in regions B and D with the number of terms in region A. Accuracy may correspond to a comparison of the combined number of terms in regions B and D with the number of terms region C.

Illustratively, predicted set 240 may include subsets of terms 220 characterized by one or more of the following: (1) each single-word term among terms 220; (2) consecutive multi-word terms among terms 220 that are identified as occurring frequently in corpus 210; and (3) terms among terms 220 that appear in one or more databases of terms.

In some embodiments, selecting consecutive multi-word terms (subset (2) above) may include identifying terms whose frequency in corpus 210 exceeds a first predetermined threshold. For example, if corpus 210 includes 1000 words and a given multi-word term appears 15 times, the frequency is 0.015. If the first predetermined threshold is 0.01, then the frequency exceeds the threshold and the term is included predicted set 240. In some embodiments, the first predetermined threshold may be a tunable hyperparameter.

Additionally or alternately, identifying frequently occurring multi-word terms (subset (2) above) may include identifying multi-word terms whose frequency in corpus 210 relative to the frequency of its constituent terms exceeds a second predetermined threshold. Like the first predetermined threshold, the second predetermined threshold may be a tunable hyperparameter. For example, if corpus 210 includes 1000 words, a given two-word term appears 15 times, the first word in the two-word term appears 30 times, and the second word in the two-word term appears 50 times, then the relative frequency of the two-word term (e.g., a fraction obtained by dividing the frequency of the two-word term by the product of its constituent term) is 0.01. If the second predetermined threshold is 0.005, then then the relative frequency exceeds the threshold and the two-word term is included in predicted set 240. In some embodiments, a combination of multiple approaches may be used to identify frequently-occurring multi-word terms in corpus 210.

In some embodiments, identifying terms in corpus 210 that appear in a database of terms (subset (3) above) may include accessing a community-curated database. For example, in the context of biomedical applications, the database of terms may include a community-curated biomedical database that includes terms that are manually selected by contributors to the community as being of interest for biomedical applications. In some embodiments, the database of terms may correspond to a search log that identifies past query terms used in historical searches.

As indicated above, at least a portion of the terms in predicted set 240 may be predicted using frequency-based techniques (e.g., subset (2)) and/or database-based techniques (e.g., subset (3)). However, using such techniques alone may be under-inclusive (e.g., predicted set 240 may have low recall). For example, these techniques are unlikely to include terms of emerging interest, e.g., terms that appear infrequently in corpus 210 but are disproportionately likely to be used as query terms due to factors such as a recent surge in interest. Because terms of emerging interest generally appear infrequently in corpus 210, they are unlikely to predicted using frequency-based techniques. Terms of emerging interest also may not appear in past search logs or databases of known terms, so they are also unlikely to be predicted using database-based techniques.

Such terms of emerging interest can be particularly challenging to predict when they include multi-word phrases. For example, the total number of multi-word phrases in corpus 210 may significantly outnumber the number of single-word terms in corpus 210 because the number of multi-word phrases grows combinatorically when combinations of terms are considered. Consequently, whereas it may be possible (e.g., by brute force) to include each single-word term appearing in corpus 210 in predicted set 240, limitations on computational resources may make it impractical to include each multi-word phrase appearing in corpus 210 in predicted set 240, including multi-word phrases.

To illustrate, consider the phrase "quick brown fox." The term "brown fox" (e.g., a consecutive two-word term) may be included in predicted set 240. On the other hand, the term "quick fox" (e.g., a non-consecutive two-word term) may not be included in predicted set 240 using the approaches described above. However, the terms "quick" and "fox" are grammatically related and form a logical grouping of words (e.g., "quick" is an adjective describing "fox"), so it is plausible that "quick fox" may later be used as a query term. Accordingly, it may be desirable to augment predicted set 240 to include such grammatically related, non-consecutive multi-word terms (and/or consecutive multi-word terms that occur infrequently but are grammatically related).

To increase the recall for such terms, various techniques may be used to augment predicted set 240. These techniques may be combined with the frequency-based and/or database-based techniques described previously, or may replace them. In some embodiments, corpus 210 may be provided as an input to a neural network model, such as neural network model 160. The neural network model may be configured as a dependency parser that is trained to generate a dependency parse of each sentence in corpus 210. The dependency parser tags terms with their part-of-speech (e.g., noun, verb, adjective, etc.) and identifies relationships among terms in the sentence (e.g., subject, object, modifier, etc.). The output of the dependency parser may be analyzed according to one or more heuristic rules to identify terms that are likely to be in target set 230 and should therefore be included in predicted set 240. In this manner, the number and type of heuristic rules may be configured to achieve an over-inclusive predicted set 240 (e.g., high recall, low precision). That is, referring to the labeled regions of FIG. 2, the heuristic rules may be configured such that the number of terms in region A is small relative to regions B, C, and D.

By generating a predicted set 240 that is over-inclusive, even those terms in target set 230 that are difficult to predict in advance (e.g., terms of emerging interest) are likely to be included in predicted set 240. By contrast, techniques that identify an under-inclusive predicted set 240 (e.g., frequency-based techniques or database-based techniques alone) are unlikely to achieve adequate recall of the terms in target set 230.

Once predicted set 240 is identified, one or more pre-computed data structures 260 may be generated or updated based on the terms in predicted set 240. In some embodiments, generating and updating the pre-computed data structures 260 may be performed by pre-processing program 152.

In general, the pre-computed data structures 260 facilitate the mapping of a term in predicted set 240 to a corresponding vector representation in a semantic space. For example, pre-computed data structures 260 may include a vector representation data structure 262, which contains pre-calculated vector representations for one or more terms in predicted set 240. A look-up operation can be performed on vector representation data structure 262 to determine the vector representation for a particular term.

On the other hand, pre-calculating vector representations for each term in predicted set 240 can be computationally intensive, particularly when predicted set 240 is configured to be over-inclusive or otherwise includes a large number of terms. Accordingly, given that predicted set 240 may include a large number of terms that are not in target set 230 (e.g., they are unlikely to subsequently appear as query terms), it may not be desirable to use computational resources to pre-calculate vector representations for each term in predicted set 240.

In some embodiments, rather than pre-calculate vector representations for each term in predicted set 240, a smaller subset of predicted set 240 may be selected for which pre-computed vector representations are determined. This subset is identified as a pre-computed set 250 in FIG. 2. Pre-computed set 250 may contain a significantly smaller number of terms than predicted set 240. For example, pre-computed set 250 may be one or more orders of magnitude (factors of ten) smaller than predicted set 240. Illustratively, the terms in pre-computed set 250 may be selected from the terms predicted set 240 using frequency-based techniques, e.g., by selecting the n most frequently occurring terms among predicted terms 240. Unlike the set of predicted terms 240, pre-computed set may not have high recall. That is, referring to the labeled regions of FIG. 2, the number of terms in region D may be small relative to the combined number of terms in regions A and B.

In some embodiments, the pre-computed data structures 260 may include a correlation data structure 264 that contains pre-calculated correlation data for each term in predicted set 240 (e.g., including terms that are not in pre-computed set 250). In some embodiments, the correlation data may be aggregated based on correlations that are identified during the calculation of vector representations for the terms in pre-computed set 250. For example, some techniques for mapping a given term to a vector representation (including those that operate in batch mode) may, as an intermediate step, determine a correlation such as the proximity of the term to other terms in corpus 210. For a given term, the proximity data may be determined by setting a n-word window around each occurrence of the term in corpus 210 and identifying a frequency or count of terms appearing within the windows. For example, if the size of the window is three words, each window centered on the term of interest captures terms that appear adjacent to the central term. However, such techniques are generally not configured to aggregate, store, or otherwise put the intermediate correlation data to later use. In data flow 200, on the other hand, the correlation data may be aggregated and stored in correlation data structure 264, which then persists (e.g., in memory 140, database 170, cache memory, etc.) for subsequent access.

In some embodiments, each term in predicted set 240 may have at least one corresponding entry in pre-computed data structures 260. However, some terms may be omitted and/or assigned to default values. For example, terms such as numbers, stop words (e.g., commonly appearing terms such as "a," "the," "of," etc.), proper names, or the like may be assigned to a default entry in vector representation data structure 262.

Next, an application 280 is performed. Application 280 can correspond to a wide variety of applications in which a query term 282 is embedded in a semantic space (by a run-time embedding engine 284), and the resulting vector representation of query term 282 is provided to an analysis engine 286 for further analysis. For example, query term 282 may correspond to a search term provided by a user during a semantic search of corpus 210, and analysis engine 286 may use a neural network model (e.g., neural network model 160) to identify or rank documents in corpus 210 that match the search term. In some embodiments, run-time embedding engine 284 may be performed by run-time program 154.

Query term 282 is generally a member of target set 230 (e.g., the idealized, forward-looking set of terms in corpus 210 that are at some point used as query terms). Accordingly, query term 282 can be found in either region A, B, or D of target set 230. When query term 282 is in region D, query term 282 is among the terms in pre-computed set 250 for which a pre-computed vector representation is stored in vector representation data structure 262. Accordingly, for a query term 282 in region D, run-time embedding engine 284 may look up query term 282 in vector representation data structure 262 and retrieve the corresponding vector representation.

When query term 282 is in region B, query term 282 is among the terms in predicted set 240 for which pre-computed correlation data is stored in correlation data structure 264. Accordingly, for a query term 282 in region B, run-time embedding engine 284 may look up query term 282 in correlation data structure 264 and retrieve the corresponding correlation data. Based on the retrieved correlation data, run-time embedding engine 284 may map query term 282 to its corresponding vector representation. Exemplary techniques for mapping query term 282 to its corresponding vector representation based on correlation data are described in further detail below with reference to FIG. 6.

When query term 282 is in region A, query term 282 is not in either pre-computed set 250 or predicted set 240, and therefore query term 282 does not have a corresponding entry in pre-computed data structures 260. Accordingly, for a query term 282 in region A, a run-time correlation data engine 290 may determined correlation data at run-time by analyzing or scanning corpus 210. The resulting run-time correlation data may generally be the same as pre-computed correlation data stored in correlation data structure 264, but the run-time correlation data may take longer to obtain because it does not take advantage of efficiency gains associated with using pre-computed data structures 260.

Figure 3:
FIG. 3 is a simplified diagram of a vector representation data structure according to some embodiments.

FIG. 3 is a simplified diagram of a vector representation data structure 300 according to some embodiments. In some embodiments, vector representation data structure 300 may be used to implement vector representation data structure 262. For each of a plurality of terms 301-309 (e.g., each of the terms in pre-computed set 250), a corresponding pre-computed vector representation 311-319 is provided.

Figure 4:
FIG. 4 is a simplified diagram of a correlation data structure according to some embodiments.

FIG. 4 is a simplified diagram of a correlation data structure 400 according to some embodiments. In some embodiments, correlation data structure 400 may be used to implement correlation data structure 264. For each of a plurality of terms 401-409 (e.g., each of the terms in predicted set 240), corresponding correlation data is provided. Illustratively, the correlation data may include a list of terms 411-419 that appear proximate to each term 401-409 in a corpus (e.g., corpus 210). An aggregate metric indicating how frequently terms 411-419 appear proximate to terms 401-409 in the corpus, such as a count 421-420 or another suitable metric (e.g., a normalized frequency value), may also be provided.

The foregoing descriptions of vector representation data structure 300 and correlation data structure 400 are non-limiting, and various features may be added, removed, modified, substituted, or rearranged. Although data structures 300 and 400 are depicted using a tabular representation (e.g., arranged in rows and columns), various non-tabular formats or representations may be used. Similarly, tabular formats in alternative configurations may be used. In some embodiments, terms 301-309, 401-409, and/or 411-419 may be represented as text strings, index values, hash values, or the like.

FIG. 5 is a simplified diagram of a method 500 for generating one or more pre-computed data structures based on a document corpus according to some embodiments. In some embodiments, method 500 may be performed by one or more processors (e.g., processor 130) during execution of a pre-processing program (e.g., pre-processing program 152). In some embodiments, the one or more pre-computed data structures may include a vector representation data structure (e.g., vector representation data structure 262), a correlation data structure (e.g. correlation data 264), or both.

At a process 510, a document corpus (e.g., corpus 210) is accessed. In some embodiments, the document corpus may correspond to set of digital documents related to particular subject matter, e.g., biomedical topics. The document corpus may be compiled manually and/or using automated techniques. In some embodiments, the document corpus may include heterogenous documents, e.g., documents of different file formats (e.g., pdf, scanned images, word processing documents, web pages, etc.). Prior to and/or during accessing the document corpus, text may be extracted from the digital documents and converted to a uniform format. Various pre-processing techniques may be applied to the document corpus, such as, for example, tokenization, lemmatization, part-of-speech tagging, named-entity recognition, or the like. Each token (e.g., words, sentences, etc.) may be provided using a data structure that includes various data and/or metadata associated with the token, such as one or more representations of the token (e.g., plain text, index values, etc.), a root associated with the token, the locations of the token in the corpus, frequency data associated with the token, or the like. In some embodiments, the contents of document corpus may be accessed in native file formats, as plain text, as encoded representations, or as other suitable representations, and may be converted among various representations.

At a process 520, a first set of terms (e.g., predicted set 240) that includes a plurality of predicted query terms appearing in the document corpus is identified. In general, the goal of the first set of terms is to match a target set of terms (e.g., target set 230) that are later used as query terms but are not known in advance. The first set of terms can be measured in terms of recall (e.g., the number or fraction of terms in the target set that are covered by the first set) and/or accuracy (e.g., the number or fraction of terms in the first set that are among the terms in the target set). In some embodiments, the first set of terms are selected to be high recall, even at the expense of low accuracy. For example, the first set of terms may include each single-word term that appears in the document corpus. In some embodiments, at least a portion of the terms in the first set may be selected using frequency-based techniques. For example, frequency-based techniques may be applied to select multi-word terms. In some embodiments, at least a portion of the terms in the first set may be selected using database-based techniques. For example, terms that appear in a search log of prior search terms or a curated database of terms may be selected.

Moreover, at least a portion of the terms in the first set may be determined based on grammatical relationship among words in multi-word terms. For example, a neural network model (e.g., neural network model 160) may be applied to generate a dependency parse of the sentences in the document corpus. Subsequently, heuristic rules may be applied to the dependency parse to select terms. The number, type, and parameters of the heuristic rules can then be configured to achieve the desired level of recall in the first set of terms.

At a process 530, a second set of terms (e.g., pre-computed set 250) is identified, the second set being a subset of the first set. Whereas the first set generally includes a large, over-inclusive set of terms selected to achieve high recall, the second set is generally significantly smaller and may be under-inclusive (e.g., low recall). In some embodiments, the second set may be selected by applying frequency-based techniques to the first set, and the technique can vary based on the length of the terms being selected. For example, the second set may include each single-word term (unigram) in the first set, two-word terms (bigrams) whose count or frequency exceeds a first threshold, three-word terms (trigrams) whose count or frequency exceeds a second threshold, and so on. The thresholds used for terms of different lengths may be the same or different. In some embodiments the techniques and/or parameters (e.g., count or frequency thresholds) used to select the second set of terms from the first set may be configured to achieve a desired number of terms in the second set of terms. For example, the desired number of terms in the second set may reflect the computational resources available for computing vector representations of the terms in the second set.

At a process 540, a set of vector representations for the second set of terms is computed. In some embodiments, the set of vector representations may be computed using a variety of techniques for mapping terms to vector representations in a semantic space, such as the word2vec, GloVe, and fasttext techniques discussed previously. These techniques may generally operate in a batch mode, such that the semantic space is populated with vector representations for each of the terms in a single pass. Adjusting the terms that are included in the set (e.g., adding a new term to the set) may involve re-calculating each of the vector representations. The dimensionality of the vector representations may be configurable, but is generally high dimensional (e.g., 300 dimensions or more) to capture the rich variety in the meanings of different terms. In some embodiments, the set of vector representations may be stored in a vector representation data structure (e.g., vector representation data structures 262 and/or 300). The vector representation data structure may further be encoded, compressed, encrypted, or the like to facilitate efficient and/or secure communication and storage.

At a process 550, correlation data for the first set of terms is stored in a correlation data structure (e.g., correlation data structure 264 and/or 400). The correlation data is generated during the computation of the set of vector representation at process 540. In some embodiments, the correlation data may correspond to intermediate results, or an aggregation of intermediate results, that are generated during the computation of the vector representations. For example, some techniques for computing the set of vector representation at process 540 (including those that operate in batch mode) may, as an intermediate step, determine a correlation such as the proximity of a given term to other terms in the document corpus. Such proximity data may be determined by setting a n-word window around each occurrence of the term in the document corpus and identifying a frequency or count of terms appearing within the windows. The frequency or count of terms appearing within the windows may then be aggregated and stored in the correlation data structure. In some embodiments, the correlation data structure may be encoded, compressed, encrypted, or the like to facilitate efficient and/or secure communication and storage.

At a process 560, the vector representation data structure, the correlation data structure, or both are provided to a run-time embedding engine (e.g., embedding 284) that, during run-time operation, determines a vector representation of a query term (e.g., query term 282). In some embodiments, the query term may be among the first set of terms, the second set of terms, or both sets of terms. However, the query term may not be in either the first or second sets of terms. Exemplary techniques for determining the vector representation of the query term are described in further detail below with reference to FIG. 6.

Figure 6:
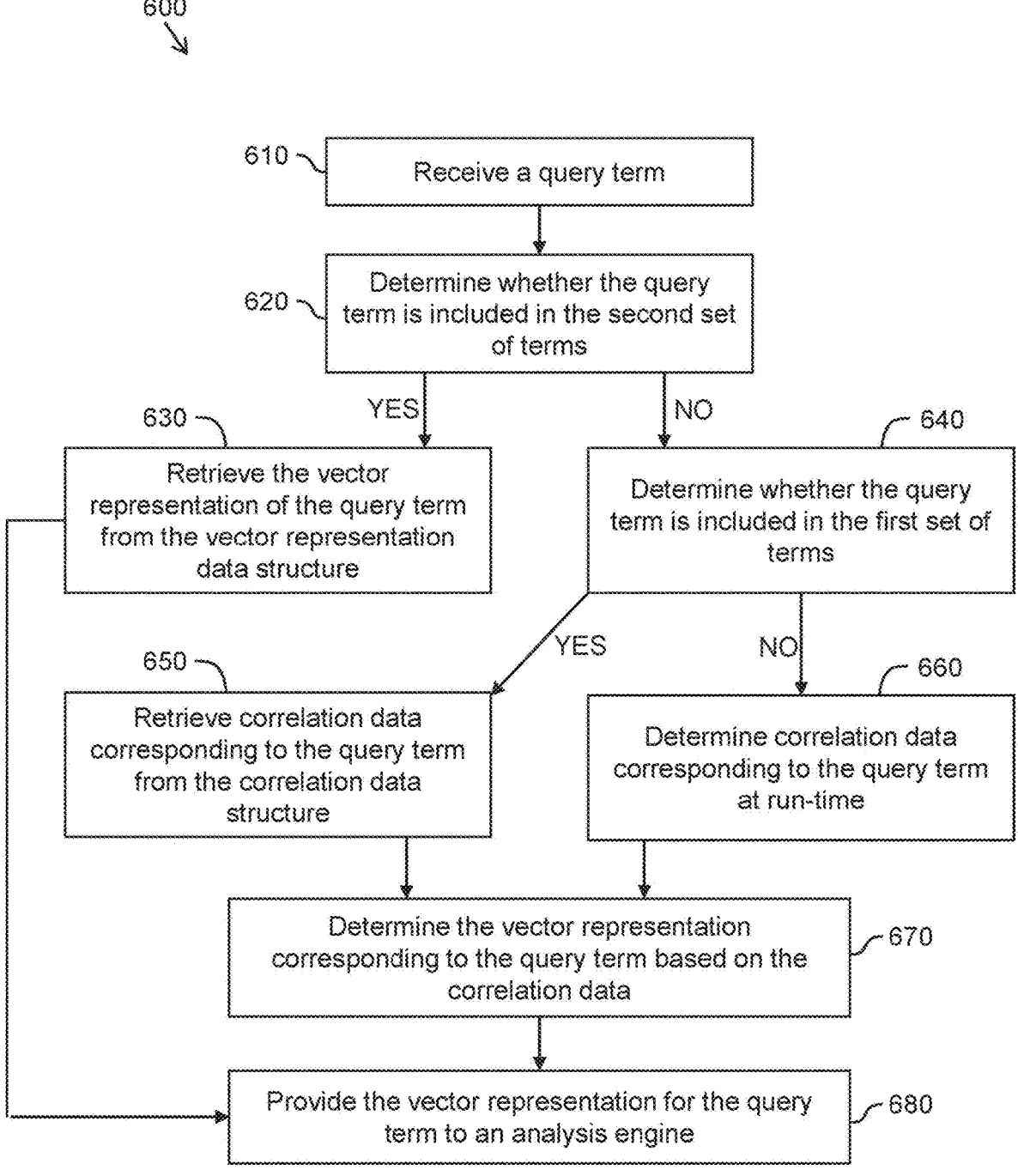
FIG. 6 is a simplified diagram of a method for determining a vector representation of a query term according to some embodiments.

FIG. 6 is a simplified diagram of a method 600 for determining a vector representation of a query term according to some embodiments. In some embodiments, method 600 may be performed by one or more processors (e.g., processor 130) during execution of a run-time program (e.g., run-time program 154). In some embodiments consistent with FIG. 5, method 600 may continue from process 560 of method 500. In this regard, method 600 may be performed using the run-time embedding engine (e.g., run-time embedding engine 284) that is provided with the vector representation data structure, the correlation data structure, or both.

At a process 610, a query term (e.g., query term 282) is received. In some embodiments, the query term may be provided by a user. For example, in a semantic search application, the query term may correspond to a search term provided by the user. In some embodiments, the query term may correspond to a term extracted from a document, e.g., in applications where the document is being compared to documents in the document corpus (e.g., corpus 210), or where the document is otherwise being analyzed using natural language processing and/or machine learning techniques. In some embodiments, the query term may be received as plain text, an index value, a hash value, an encoded representation, or another suitable representation, and may be converted among various representations.

At a process 620, it is determined whether the query term is included in the second set of terms (e.g., pre-computed set 250). For example, a lookup or search operation may be performed on the vector representation data structure (e.g., vector representation data structure 262 and/or 300), which contains the second set of terms and their corresponding pre-computed vector representations. Referring to the labeled regions of FIG. 2, determining whether the query term is included in the second set of terms may correspond to determining whether the query term is in region D. When the query term is included in the second set of terms, method 600 may proceed to a process 630 for retrieving the vector representation of the query term. When the query term is not included in the second set of terms, method 600 may proceed to a process 640 for determining whether the query term is included in the first set of terms.

At a process 630, in response to determining that the query term is included in the second set of terms, the vector representation of the query term is retrieved from the vector representation data structure. For terms that are included in the second set, the vector representations are pre-computed and stored in the vector representation data structure, so retrieval may be performed efficiently. In some embodiments, during retrieval, the vector representation data structure (or portions thereof) may be decoded, decompressed, decrypted, or the like. After the vector representation is retrieved, method 600 may proceed to a process 680 for providing the vector representation to an analysis engine.

At a process 640, in response to determining that the query term is not included in the second set of terms, it is determined whether the query term is included in the first set of terms (e.g., predicted set 240). For example, a lookup or search operation may be performed on the correlation data structure (e.g., correlation data structure 264 and/or 400), which contains the first set of terms and their corresponding correlation data. Referring to the labeled regions of FIG. 2, determining whether the query term is included in the first set of terms may correspond to determining whether the query term is in region B or, alternatively, whether the query term is in region A. When the query term is included in the first set of terms (region B), method 600 may proceed to a process 650 for retrieving correlation data corresponding to the query term from the correlation data structure. When the query term is not included in the first set of terms (region A), method 600 may proceed to a process 660 for determining correlation data corresponding to the query term at run-time.

At a process 650, in response to determining that the query term is included in the first set of terms, the correlation data corresponding to the query term is retrieved from the correlation data structure. For terms that are included in the first set, the vector representations are pre-computed and stored in the correlation data structure, so retrieval may be performed efficiently. In some embodiments, during retrieval, the correlation data structure (or portions thereof) may be decoded, decompressed, decrypted, or the like. After the correlation data is retrieved, method 600 may proceed to a process 670 for determining the vector representation corresponding to the query term based on the correlation data.

At a process 660, in response to determining that the query term is not included in the first set of terms, the correlation data corresponding to the query term is determined at run-time. The correlation data determined at process 660 is generally the same as the correlation data retrieved at process 650. However, because the correlation data for terms that are not in the first set are not pre-computed and stored in the correlation data structure, the correlation determined at process 660 may be determined using a run-time correlation data engine (e.g., run-time correlation data engine 290) to access and scan the document corpus (e.g., corpus 210) at run-time. For example, when the correlation data includes the proximity of a given term to other terms in the document corpus, determining the correlation data at run-time may include scanning the document corpus to set an n-word window around each occurrence of the term in the document corpus and identifying a frequency or count of terms appearing within the windows. After the correlation data is determined, method 600 may proceed to a process 670 for determining the vector representation corresponding to the query term based on the correlation data.

At a process 670, the vector representation corresponding to the query term is determined based on a correlation between the query term and one or more terms in the second set of terms, the correlation being determined based on the correlation data identified at process 650 or 660. In some embodiments, the vector representation for the query term may be determined without re-calculating the vector representations for the terms in the second set of terms. Rather, the pre-calculated vector representations for the second set of terms (e.g., the vector representations stored in the vector representation data structured) may be used to estimate the vector representation for the query term. In this manner, significantly less computational resources may be used to determine the vector representation of the query term at process 670 relative to an approach in which vector representations for the second set of terms are re-calculated. Exemplary techniques for determining the vector representation corresponding to the query term based on the relationship are described in further detail below with reference to FIG. 7. After the vector representation is determined, method 600 may proceed to a process 680 for providing the vector representation to an analysis engine.

At a process 680, the vector representation for the query term is provided to an analysis engine (e.g., analysis engine 286) that analyzes the query term based on its vector representation. For example, in semantic search applications, the analysis engine may include a neural network model (e.g., neural network model 160) that identifies or ranks documents in the document corpus that match the search query. In some embodiments, the analysis engine may be implemented as part of the run-time program. Additionally or alternately, the analysis engine may be executed at a later time and/or using different computing resources than the run-time program used to determine the vector representation for the query term.

Figure 7:
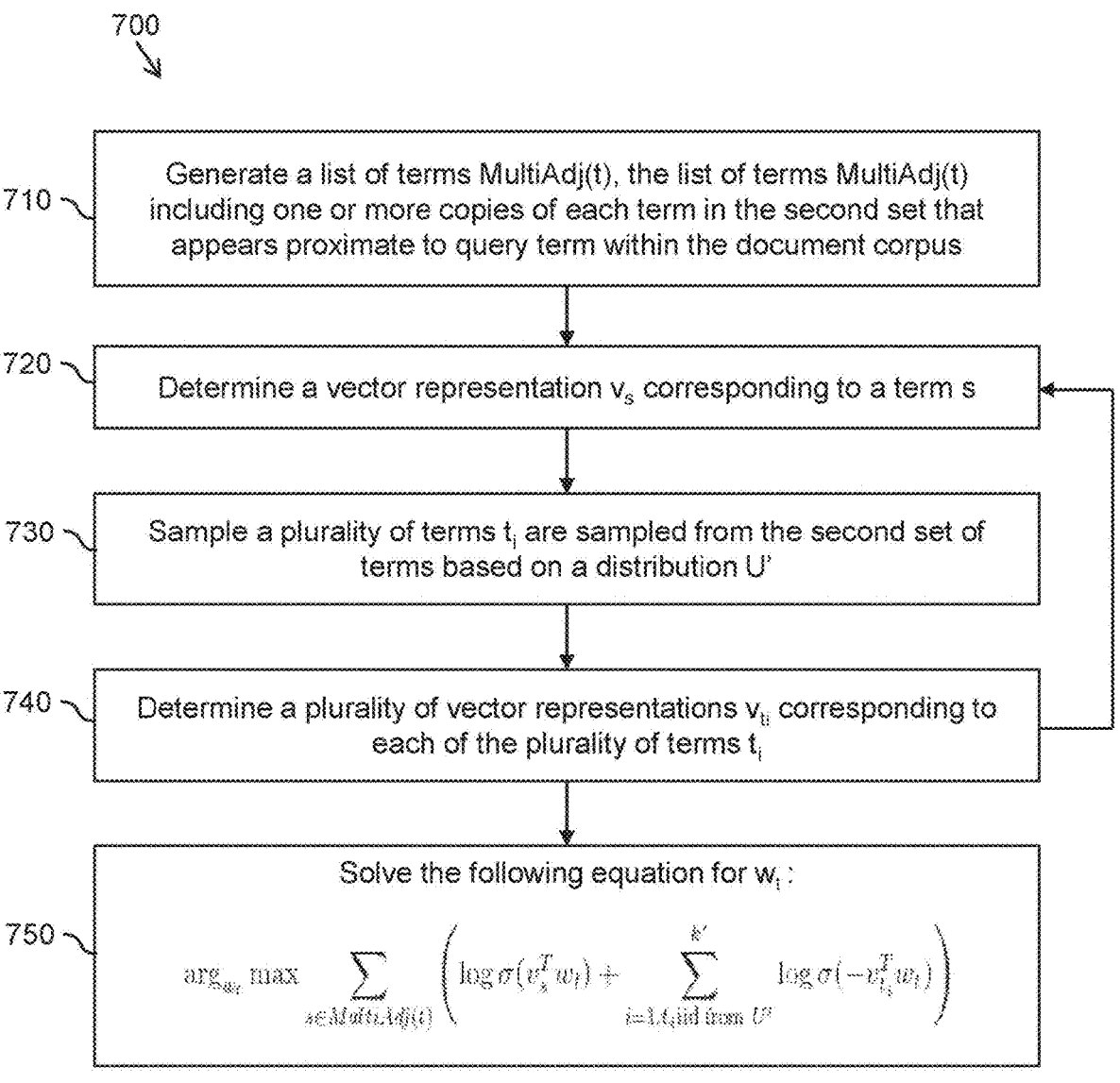
FIG. 7 is a simplified diagram of a method for determining a vector representation of a query term based on correlation data according to some embodiments.

FIG. 7 is a simplified diagram of a method 700 for determining a vector representation for a query term based on correlation data according to some embodiments. In some embodiments, method 700 may be performed by one or more processors (e.g., processor 130) during execution of a run-time program (e.g., run-time program 154). In some embodiments consistent with FIG. 6, method 700 may be used to implement process 670 of method 600.

At a process 710, a list of terms MultiAdj(t) is generated, the list of terms MultiAdj(t) including one or more copies of each term in the second set (e.g., pre-computed set 250) that appears proximate to query term (e.g., query term 282) within the document corpus (e.g., corpus 210). A number of the one or more copies is determined based on a number of times that each term in the second set appears proximate to query term within the document corpus (e.g., the term appears in the same n-word sized window centered on the query term). For example, if a given term in the second set appears proximate to the query term on three occasions within the document corpus, the list of terms MultiAdj(t) may include three copies of the term. In some embodiments, the list of terms MultiAdj(t) may be generated based on correlation data that is stored in a correlation data structure, such as correlation data structure 264 and/or 400. For example, the correlation data structure may include an entry for the query term that identifies each term in the second set of terms that appears proximate to the query term, along with a count of the number of times that the term appears proximate to the query term.

Next, the following processes 720-740 may be repeated for each term s in the list of terms MultiAdj(t).

At a process 720, a vector representation $v_s$ corresponding to the term s is determined. In some embodiments, because the term s is in the second set of terms, the vector representation $v_s$ may be retrieved from the vector representation data structure (e.g., vector representation data structure 262 and/or 300). When the term s is a copy of another term in the list of terms MultiAdj(t) for which the vector representation has already been retrieved, the vector representation $v_s$ may be determined based on the previously-retrieved vector representation.

At a process 730, a plurality of terms $t_i$ are sampled from the second set of terms based on a distribution U'. In some embodiments, the distribution U' may be determined based on the term-wise corpus distribution U obtained based on the frequency with which each term in the second set appears in the document corpus. In some embodiments, each probability in the term-wise corpus distribution U may be raised to the power of 0.75 (or another suitable power) and normalized to obtain the probability distribution U'. In some embodiments, the plurality of terms $t_i$ may be sampled randomly and independently. The number of the plurality of terms $t_i$ that are sampled may be designated k and may be set to a default value (e.g., five) or tuned empirically. One way to perform hyperparameter tuning for the variable k is to use as training data samples from the second set (e.g., a term for which there is already a known vector representation). Using this training data, processes 720-750 may be repeated for different values of k to determine the value of k that results in dynamically computed vector representations that most closely match the precomputed vector representations for the samples from the second set.

At a process 740, a plurality of vector representations $v_{t_i}$ corresponding to each of the plurality of terms $t_i$ are determined. In some embodiments, because the terms $t_i$ are in the second set of terms, the corresponding vector representations $v_{t_i}$ may be retrieved from the vector representation data structure (e.g., vector representation data structure 262 and/or 300).

At process 750, the following equation is solved for the variable $w_t$:

$$\arg_{w_t}\max \sum_{s\in MultiAdj(t)}\left(\log\sigma(v_s^T w_t) + \sum_{i=1,t_i lid\ from\ U'}^{k'} \log\sigma(-v_{t_i}^T w_t)\right)$$

where $w_t$ is the vector representation corresponding to the query term and $\sigma(\ )$ is an activation function (e.g., the sigmoid function). In some embodiments, the equation may be solved for w using a suitable optimization tool, such as the Adam optimizer. In some embodiments, $w_t$ may be initialized randomly and iteratively updated to solve the equation. In some embodiments, the pre-computed vector representations $v_s$ and/or $v_{t_i}$ may be held fixed at each iteration, in contrast to a batch mode approach in which vector representations $v_s$ and $v_{t_i}$ may be iteratively updated when solving the equation. After the vector representation $w_t$ is determined, the vector representation $w_t$ may be provided to an analysis engine (e.g., analysis engine 286) that analyzes the query term based on its vector representation, as described in process 680. Further, the iterative determination of the vector representation $w_t$ leads to additional advantages related to enrichments and enrichment classes. For example, an iterative vector representation $w_t$ can be used to determine enrichment terms associated with the query term by analyzing what vectors are near to or in the neighborhood of the vector representation of the query term in the vector space. A proximity in the vector space can reveal associations between two terms that are not apparent based on inspection of the corpus alone. For example, in a corpus, term A may appear proximate to term B and term C may appear proximate to term D, but terms A and D do not appear proximate to each other. However, in the vector space the vector representations for terms A and D may be proximate to or in the neighborhood of each other, which suggests an association between terms A and D. Vector representations that are closer to each other in the vector space suggest a stronger association. In the above example, term A is said to be enriched in term D, and term A is said to have an enrichment (i.e. term D). Enrichment classes can also be determined based on what enrichments are associated with the query term, thus in some embodiments, providing further information of associations for the query term. In some embodiments, by determining what enrichment class or classes an iterative vector representation $w_t$ is enriched in, the next iteration of the vector representation can use vectors of terms in those enrichment class or classes to compute the vector representation for the query term more quickly and more accurately. This can be particularly beneficial when the query term is a newly coined term/named entity for which less information on the term is available (e.g. class of term, relationship to other terms, etc.). Moreover, the iterative vector representation $w_t$ enrichments can be used to return results for other queries that do not expressly include the newly coined term in subsequent searches.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. An apparatus for mapping a sentence to a vector representation in a semantic space, wherein the apparatus comprises:

at least a computing device, wherein the computing device comprises:

a memory; and at least a processor communicatively connected to the memory, wherein the memory contains instructions configuring the at least a processor to:

access, using the at least a processor, a document corpus;

predict, using the at least a processor, a plurality of query sentences appearing in the document corpus prior to a semantic search of the document corpus;

identify, using the at least a processor, a first set of sentences that includes the plurality of predicted query sentences appearing in the document corpus;

identify, using the at least a processor, a second set of sentences, the second set being a subset of the first set of sentences;

store, in a first data structure, correlation data generated from the first set of sentences;

store, in a second data structure, a set of vector representations computed from the second set of sentences;

provide, using the at least a processor, the first data structure to a run-time embedding engine configured to, during run-time operation, determine a vector representation of a first query sentence among the first set of sentences;

rank, using the at least a processor, a plurality of documents of the document corpus based on the vector representation of the first query sentence and vector representations of sentences of the plurality of documents using a neural network model, wherein the neural network is configured as a dependency parser that is trained to generate a dependency parse of each sentence in the document corpus; and display, using a graphical user interface of a downstream device, the ranked plurality of documents, wherein displaying the ranked plurality of documents further comprises:

receiving, using the graphical user interface, user feedback; and modifying, using the at least a processor, the ranked plurality of documents based on the user feedback.

2. The apparatus of claim 1, wherein determining the vector representation of the first query sentence among the first set of sentences comprises:

receiving the first query sentence;

determining that the first query sentence is included in the first set of sentences; and retrieving correlation data corresponding to the first query sentence from the data structure;

wherein the vector representation of the first query sentence is determined based on a correlation between the first query sentence and one or more sentences in the second set of sentences, the correlation being determined based on the correlation data.

3. The apparatus of claim 2, wherein the vector representation of the first query sentence is determined by mapping the first query sentence to its corresponding vector representation based on the retrieved correlation data.

4. The apparatus of claim 1, wherein identifying the first set of sentences comprises accessing a database of sentences corresponding to a log of sentences used in historical searches.

5. The apparatus of claim 1, wherein the computing device is further configured to generate the vector representations of the sentences of the plurality of documents.

6. The apparatus of claim 1, wherein the computing device is further configured to determine, at run-time, a vector representation of a second query sentence not in the first set of sentences.

7. The apparatus of claim 1, wherein the computing device is further configured to look up, at run-time, a vector representation of a second query sentence in the second set of sentences.

8. The apparatus of claim 1, wherein the correlation data corresponds to an aggregation of intermediate results that are generated during the computing of the set of vector representations.

9. The apparatus of claim 1, wherein identifying the first set of sentences comprises identifying sentences whose frequency in the document corpus relative to the frequency of its constituent terms exceeds a predetermined threshold.

10. The apparatus of claim 1, wherein identifying the second set of sentences comprises identifying sentences whose frequency in the document corpus relative to the frequency of its constituent terms exceeds a predetermined threshold.

11. A method comprising:

accessing, using at least a processor, a document corpus;

predicting, using the at least a processor, a plurality of query sentences appearing in the document corpus prior to a semantic search of the document corpus;

identifying, using the at least a processor, a first set of sentences that includes the plurality of predicted query sentences appearing in the document corpus;

identifying, using the at least a processor, a second set of sentences, the second set being a subset of the first set of sentences;

storing, in a first data structure, correlation data generated from the first set of sentences;

storing, in a second data structure, a set of vector representations computed from the second set of sentences;

providing, using the at least a processor, the first data structure to a run-time embedding engine configured to, during run-time operation, determine a vector representation of a first query sentence among the first set of sentences; and ranking, using the at least a processor, a plurality of documents of the document corpus based on the vector representation of the first query sentence and vector representations of sentences of the plurality of documents using a neural network model, wherein the neural network is configured as a dependency parser that is trained to generate a dependency parse of each sentence in the document corpus; and display, using a graphical user interface of a downstream device, the ranked plurality of documents, wherein displaying the ranked plurality of documents further comprises:

receiving, using the graphical user interface, user feedback; and modifying, using the at least a processor, the ranked plurality of documents based on the user feedback.

12. The method of claim 11, wherein determining the vector representation of the first query sentence among the first set of sentences comprises:

receiving the first query sentence;

determining that the first query sentence is included in the first set of sentences; and retrieving correlation data corresponding to the first query sentence from the data structure;

wherein the vector representation of the first query sentence is determined based on a correlation between the first query sentence and one or more sentences in the second set of sentences, the correlation being determined based on the correlation data.

13. The method of claim 12, wherein the vector representation of the first query sentence is determined by mapping the first query sentence to its corresponding vector representation based on the retrieved correlation data.

14. The method of claim 11, wherein identifying the first set of sentences comprises accessing a database of sentences corresponding to a log of sentences used in historical searches.

15. The method of claim 11, wherein the method further comprises generating the vector representations of the sentences of the plurality of documents.

16. The method of claim 11, wherein the method further comprises determining, at run-time, a vector representation of a second query sentence not in the first set of sentences.

17. The method of claim 11, wherein the method further comprises looking up, at run-time, a vector representation of a second query sentence in the second set of sentences.

18. The method of claim 11, wherein the correlation data corresponds to an aggregation of intermediate results that are generated during the computing of the set of vector representations.

19. The method of claim 11, wherein identifying the first set of sentences comprises identifying sentences whose frequency in the document corpus relative to the frequency of its constituent terms exceeds a predetermined threshold.

20. The method of claim 11, wherein identifying the second set of sentences comprises identifying sentences whose frequency in the document corpus relative to the frequency of its constituent terms exceeds a predetermined threshold.

* * * * *